United States Patent
Goudedranche et al.

(10) Patent No.: US 6,551,648 B1
(45) Date of Patent: Apr. 22, 2003

(54) METHOD FOR OBTAINING MILK PRODUCTS CONTAINING SELECTED FRACTIONS OF FAT GLOBULES

(75) Inventors: Henri Y M Goudedranche, Pace (FR); Jean-Louis J Maubois, Pace (FR); Jacques E Fauquant, Pleumeleuc (FR)

(73) Assignee: Institut National de la Recherche Agronomique (FR)

( * ) Notice: Subject to any disclaimer, the term of this patent is extended or adjusted under 35 U.S.C. 154(b) by 0 days.

(21) Appl. No.: 09/646,732

(22) PCT Filed: Mar. 18, 1999

(86) PCT No.: PCT/FR99/00632

§ 371 (c)(1),
(2), (4) Date: Nov. 21, 2000

(87) PCT Pub. No.: WO99/48376

PCT Pub. Date: Sep. 30, 1999

(30) Foreign Application Priority Data

Mar. 20, 1998 (FR) .............................. 98 03478

(51) Int. Cl.⁷ ................................. A23C 9/00
(52) U.S. Cl. ........................ 426/580; 210/651; 426/478; 426/491

(58) Field of Search ................................ 426/491, 580, 426/582, 583, 478, 490; 210/634, 650, 651, 649

(56) References Cited

U.S. PATENT DOCUMENTS

| | | | | |
|---|---|---|---|---|
| 4,140,806 A | * | 2/1979 | Glimenius et al. | 426/491 |
| 5,028,436 A | * | 7/1991 | Gauri | 426/491 |
| 5,256,437 A | * | 10/1993 | Degen et al. | 426/580 |
| 5,395,531 A | * | 3/1995 | Degen et al. | 210/636 |
| 5,401,523 A | * | 3/1995 | Degen et al. | 426/580 |

FOREIGN PATENT DOCUMENTS

| | | |
|---|---|---|
| DE | 3743440 | 6/1989 |
| FR | 2692441 | 12/1993 |
| FR | 2731587 | 9/1996 |

* cited by examiner

*Primary Examiner*—Leslie Wong
(74) *Attorney, Agent, or Firm*—Muserlian, Lucas and Mercanti

(57) ABSTRACT

The invention concerns a method for selectively separating, according to size, fat globules present in food or biological medium, which consists in subjecting the medium to be treated to at least tangential flow microfiltration with a cut-point threshold ranging between 1.8 and 10 $\mu$m in substantially uniform transmembrane differential pressure and in recuperating the resulting concentrate and permeate.

7 Claims, No Drawings

METHOD FOR OBTAINING MILK PRODUCTS CONTAINING SELECTED FRACTIONS OF FAT GLOBULES

This application is a 371 of PCT/FR99/00632 filed Mar. 18, 1999.

The present invention relates to new products with original fat globule distribution characteristics, the method of obtaining such products and the applications thereof. The preferred field of this invention is the dairy product one.

More particularly, the invention relates to a process for selectively separating according to the size thereof without modifying significantly their membrane integrity, fat globules being present in a food or biological medium. In the following text, the invention has been described more in detail by referring to milk treatment. This one is in fact a particularly interesting case of food liquid adapted to be subjected to said process.

Fats contained in milk produced by mammals (cow, goat, sheep, cow-buffalo, mare, she-ass, women, etc.) are present at more than 95% as spherical globules, visible under optical microscope, with a diameter in the range of 0.1 to 20 $\mu$m. As regards cow milk, the average diameter thereof is in the range of 3 and 5 $\mu$m and their gaussian dispersion is mainly comprised between 2 and 12 $\mu$m (Alais, 1984, Science du Lait, Edition Sepaic). Most of the fat globules (80%) have a diameter lower than 0.1 $\mu$m, but only represents a very low proportion in weight of the milk fat material (Keenan et al., 1988, Fundamentals of Dairy Chemistry, Edition Van Nostrand Reinhold). The fat globule size distribution varies slightly according to the species, the feed and the lactation period for dairy cattle (Keenan et al., supra).

Fat globules from cow milk are formed with a membrane having a complex structure comprising numerous protein kinds (20 to 40 according to the authors) with amphiphile properties, like butyrophiline, or enzymatic ones, like xantine oxidase, complex lipids (phospholipids and cerebrosids some of which have also complex glycations, including sialic acid, N-acetylgalactosamine, . . . ) and nucleic acids (Keenan et al., supra) surrounding a droplet of di- and triglycerides, being partially crystallized at room temperature (Alais, supra).

Separation of fat globules from the milk rest, i.e. a so-called phenomenon of skimming, is based upon the volume mass difference (density) existing between globules and the liquid in which they are suspended. Two skimming types are conventionally distinguished: the so-called spontaneous skimming, beforehand quite practiced in manual butter- and cheese-manufacturing, so providing an agglomerated fat globule enriched layer, an operation performed at 5–10° C. during 10–16 hr, and the centrifugal skimming where whole milk subjected to a centrifugal rotation of about 4000 to 5000 rpm within a pile of conical disks (Towler, 1986, Modem Dairy Technology, Edition Robinson) is continuously separated into cream and skimmed milk. The cream being obtained according to such a process and used in the worldwide dairy industry is a milk that is strongly enriched with globular fat material (the most current content thereof is 400 g/kg). Depending upon the equipment being used, the fats content of the skimmed milk is equal to or lower than 0.5 g/kg.

There exists a need in products, in particular dairy products, comprising selected fractions of fat globules as well as products containing calibrated fat globules. The dairy industry is looking more and more for new products meeting customers' needs and amongst them products coming from fat product conversion.

The object of the present invention relates to a new methodology for separating and fractioning through microfiltration membranes fats contained in a food or biological medium, in particular in the milk produced by dairy females, based not upon volume mass differences between fat globules and skimmed milk like in the prior art, but upon particle size differences of the milk components of mammals.

Thus, the invention does not relate to a total separation of the globular fat material, but to a differential fractioning of said fats according to the globule size so as to implement the surprising properties of the fractions enriched with small and large globules.

The membrane micro-filtration technique is known per se and has been already proposed in the dairy industry in particular. As a pertinent reference, the article of J. L. Maubois titled "Current uses and future perspectives of M. F. Technology in the dairy industry" in Bulletin of the IDF 320, 1997, pp. 37 to 40, that reviews the skilled man knowledge in that field and mentions numerous bibliographic references.

The total whole milk skimming, i.e. the total globule retention by membrane micro-filtration in tangential flow has been proposed by Piot and al. (La Technique Laitiere n° 1016, 1987). The membrane being used with an average diameter of 1.8 $\mu$m led to a retention of about 98% fats that the authors considered as insufficient with respect to the centrifugal skimming and to improve it they proposed to use micro-filtration membranes with a lower pore diameter.

Such an article does not contain any teaching about the production of fat products containing selected fat globule fractions and highlights that the micro-filtration technique, though a priori useable for skimming and bacterial purification of crude whole milk, raises numerous unsolved technical problems.

U.S. Pat. No. 4,140,806 discloses a process for separating milk through tangential micro-filtration into a first fraction containing almost the total fats comprised in the starting product and into a second fraction being practically fat-free, in filtration conditions that do not allow to produce a substantially uniform transmembrane pressure.

Patent FR 95.02939 (publication 2,731,587) describes a process to remove somatic cells from food or biological media consisting in subjecting the medium to be treated to at least a tangential micro-filtration on a membrane having a cut-point threshold higher than 10 $\mu$m, preferably in the range of 10 to 50 $\mu$m. A preferred application for this process is milk treatment, the technical problem in such a case being to produce a milk matching the most severe sanitary quality requirements, i.e. the somatic cell rate of which is very low while keeping the common flora useful in milk conversion, for example cheese. Such prior patent only takes problems associated with the presence of milk somatic cells into account and does not contains any teaching upon the production of fat products containing selected fat globule fractions.

The products produced according such a patent are a micro-filtrate containing less than 10 000 somatic cells/ml and containing the essential starting milk fats as well as a retentate representing 4% in volume of the milk being in contact with the membrane and containing the essential part of the somatic cells and a little fat material.

The present invention has for object a process that allows to separate fat globules selectively according their size and then to produce derivates containing calibrated globules. These ones stay in their native condition, that means their membrane has not been modified and stays with the natural properties thereof.

An object of the invention aims at a process for separating selectively according to their size the fat globules present in a food or biological medium consisting in subjecting the medium to be treated to at least a tangential flow micro-filtration on a membrane with a cut-point threshold comprised between 1.8 and 10 µm in substantially uniform transmembrane differential pressure conditions and recovering the retentate and permeate being obtained.

In the case of milk, the resulting products are used for preparing milks and creams falling into the conventional conversion processes or the new processes.

The selective separation is performed on micro-filtration membranes with cut-point thresholds in the range between 1.8 and 10 µm depending upon the selection being looked for. The following illustrative examples demonstrate the interest of selecting membranes with a cut-point threshold higher than 1.8 µm and lower than 10 µm. Although the tangential flow micro-filtration treatment is possible technically outside such a range, it leads, in particular in the case of milk, to less interesting dairy products for their subsequent conversion. Thus, with membranes having pore sizes of 0.8 µm and 1.4 µm, the fats content of the permeate is weak (respectively 5.6 g/kg and 2.4 g/kg). A membrane with pore diameter of 12 µm leads to a separation of very large fat globules.

The invention finds a privileged application to fractionate globular fats contained in the whole milk or in the cream resulting from whole milk skimming.

Depending upon the starting row materials, the invention allows then to obtain new dairy products distinguished from those of prior art through their fat globule repartition.

The invention relates namely to the dairy products below, the two first ones being recovered as a permeate and the last one as a retentate:
(i) dairy product having a total fats content lower than or equal to 400 g/kg and the fat globule repartition of which is such that globules with a diameter lower than 2.0 µm represent at least 10 to 60%, preferably 20 to 40% in weight of total fats and fat globules with a diameter higher than 6 µm represent less than 10 to 30%, preferably 15 to 20%, in weight of total fats;
(ii) dairy product having a total fats content lower than or equal to 30 400 g/kg and the fat globule repartition of which is such that fat globules with a diameter lower than 3.0 µm represent at least 20 to 90%, preferably 30 to 80%, in weight of total fats and fat globules with a diameter higher than 6 µm represent less than 10 to 30%, preferably 15 to 20%, in weight of total fats;
(iii) dairy product having a total fats content higher than of equal to 30 g/kg and the fat globule repartition of which is such that globules with a diameter lower than 5 µm represent less than 90% and preferably less than 80%, in weight of total fats and fat globules with a diameter higher than 6 µm represent more than 10 and preferably more than 20%, in weight of total fats.

In the process of the invention, any mineral, organic or composite type of membrane may be used, with the proviso that the membrane being considered should be suitable for the tangential flow microfiltration installation being used.

The skilled man knows the general characteristics of the tangential flow microfiltration installations and, if necessary, he can refer to the bibliographic references mentioned thereabout in the introduction of the present specification, for example the article from Piot et al. (1987), J. L. Maubois (1997) and French Patent published under no. 2, 731,587. The content of such documents is incorporated by reference into the present specification.

The actual implementation of tangential flow micro-filtration is performed in an installation of known type. The product to be treated is caused by a feed pump to circulate in a tangential flow through channels formed with appropriate membranes or comprising the same. One part of the product, called permeate or micro-filtrate, goes through the membrane and is recovered in an enclosure. The medium, that does not go through the membrane, called retentate, is recycled back to the circulation pump and mixed with the entering product so as to be again subjected to the micro-filtration. In the practice, the installations are thus formed as a ring system. Such rings may be connected in parallel so as to form more powerful installations. An appropriate example for this type of installation is the MFS micro-filtration unit from Alfa Laval.

The process according to the invention may be operated continuously or discontinuously. In that last case, a determined quantity of the medium to be treated is contacted with the membranes of the micro-filtration unit up to the production of a permeate and a retentate with the desired properties. But the tangential flow micro-filtration installations may also be operated continuously and then the medium to be treated is brought in contact with membranes continuously, the operating conditions for the installation being selected so as to be able to recover, also continuously, a permeate and a retentate with the desired properties. The skilled man has available the adjustment means for the micro-filtration units so as to obtain such a result in industrial conditions.

To be subjected to the process according to the invention, it is sufficient if the media to be treated are pumpable so as to brought into contact with the membranes. Such media may then be suspensions or liquids. Thus, they may be as mentioned previously biological media or food media, more preferably milk or a milky product, such as a cream or a lactoserum for example, or a mixture containing one or more milks or one or more milk components. The dairy product being put in contact with the micro-filtration membrane may thus centrifugal skimming or any other means obtain a cream.

Milk may be from any dairy female : cow, goat, sheep, she-ass, cow-buffalo, separately or in mixture. The process according to the invention is particularly convenient for crude whole milk treatment.

The implementation of the process so as to provide membrane selectivity and avoid an obstruction is carried out by observing adequate hydrodynamic conditions, namely:

retentate (product retained by membrane) re-circulated at an average tangential speed of 1 to 10 m/s, preferably 4 to 8 m/s;

permeate (filtrate going through the membrane) co-current re-circulated on the external surface of the filtering membrane substrate. The permeate flow rate is regulated so as to obtain a weak identical transmembrane pressure (between 0.2 and 1.0 bar) along the membrane;

feeding filtration ring at a sufficient pressure to provide a good filtration operation;

temperature: 37 to 55° C. Implementation may also be carried out at other temperatures on the condition that the product stays pumpable and is not altered by the thermal treatment.

The permeate co-current re-circulation represents a first embodiment of the process according to the invention allowing to obtain a substantially uniform transmembrane pressure on the whole surface of the filter membrane.

Thus, co-current re-circulation of permeate on the external surface of the filtering membrane substrate allows to obtain an identical charge loss (difference between the inlet pressure and the outlet pressure of fluids circulating on either side of the filtering membrane) in each of the filter compartments and therefore a substantially identical pressure difference on each given point of the filtering membrane, on the whole filtering surface. The co-current re-circulation of permeate is for example disclosed in Swedish Patent n° SW 74 16 257 (Sandblom).

The production of a substantially uniform transmembrane pressure on the whole filtering surface constitutes one of the essential characteristics of the preparation process according to the invention so as to obtain the desired separation of globules according to their size.

According to the invention, it has been found that in the absence of a substantially uniform transmembrane pressure the micro-filtration membrane is obstructed rapidly (after about 5 to 20 minutes) and the flat globules do not go through it any more. Such filter obstructing characteristic may be an advantage in processes wherein the production of a practically fat globule free fraction and a fraction containing almost all the fat globules from the starting medium is looked for.

On the contrary, a fat globule passage default would be a serious disadvantage in the implementation according to the invention, since the selective fat globule preparation according to their size would not be possible.

The fat globules should keep their original size, that means they cannot be divided or coalesced through mechanical effects specific to the process, for example caused by pumping (nature and type of the pump, rotation speed, . . . ), circulation (circuit geometry, . . . ), extraction of retentate and permeate (valves, pumps, . . . ) or pressure being applied.

As above-mentioned, the implementation of the process may be discontinuous or continuous, but it is preferred to work in continuous so as to avoid the homogenisation and/or coalescence phenomena for the fat globules. A minimum volume of the circulation rings for retentate and permeate is desirable to limit at a maximum the residence times and thus the period of the mechanical effects on the products in the micro-filtration installation.

When co-current circulation of permeate is made and it is desired to apply a uniform transmembrane pressure, the best results have been obtained with mineral or ceramic membranes such as those made with alpha alumina marketed by Societe des Ceramiques Techniques (France) under the trade mark Membralox or by Socidet Orelis France under the trade mark KERASEP or also membranes of trade mark STERILOX (see article of J. L. Maubois, 1997, supra).

According to another aspect, the filtering membrane is arranged on a macroporous substrate with permeability longitudinal gradient. Such a substrate has such a structure that he possesses a porosity gradient that decreases from one end to the other one of the filtering membrane.

Through such a filter substrate, the hydraulic resistance decreases from one end to the other one of the filtering membrane, which allows to obtain a uniform transmembrane pressure throughout the membrane path.

Such a filter type is advantageously made with ceramics, including the filter substrate described in French Patent Application no. FR 97 04 359.

According to another aspect yet, a dynamic membrane filtration may be also carried out, such as described in French Patent no. 93 06 321 (Publication no. 2 692 441), for example by using organic membranes.

According to such an embodiment of the process of the invention, the filtering membrane and the substrate thereof are arranged on a rotating axis, said device being completed by an arrangement of a rotating disk at a small distance from the micro-filtration membrane.

The rotation of the disk located at a small distance (about 4 mm) of the filtration membrane generates a shearing stress from 50 to 100 times higher than upon a conventional tangential filtration, said shearing stress acting in the three dimensions (radial, tangential and axial). In such a device, the generation of the shearing stress on the wall is decoupled from the transmembrane pressure. Such dynamic membrane filtration processes are also described in U.S. Pat. Nos. 5,037,532, 3,997,447 and 4,956,102.

The process according to the invention involves at least a micro-filtration with a membrane having a cut-point threshold between 1.8 and 10 $\mu$m, which means that the process may be performed with a single filtration membrane meeting to such definition or in cascade, i.e. it may be practiced two or more successive micro-filtrations at different cut-point thresholds in the range of 1.8 to 10 $\mu$m so as to select a fat globule population.

Also, as known in the micro-filtration technique, the fat globule containing medium may be modified during a micro-filtration by diafiltration, in which case the medium being micro-filtrated or the corresponding retentate is added with another medium or solution, for example skimmed milk, milk ultra-filtration permeate, milk micro-filtration permeate or water.

The invention allows namely to obtain:
(a) permeates with a composition corresponding to production milks for converting:
   into yoghurts, for example, a permeate containing 10 g/kg fats;
   into consumption milks, pasteurised, UHT, for example a permeate containing 17 g/kg fats;
   into cheese, for example, a permeate containing from 17 to 38 g/kg fats;
   into slight creams, for example, a permeate containing from 150 to 300 g/kg fats;
(b) retentates, either diafiltered or not, adapted to be used as production milks for the same products as those mentioned for permeates or creams adapted to be used after churning for butter conversion.

The invention will be illustrated with no limitation in the following examples. The measurement methods used for parameters and characteristics of the above-mentioned products are those indicated in the article of M. Piot et al. (1987), supra.

EXAMPLE 1

A whole milk mixture coming from the collecting zone of a dairy has been heated at 50° C. in a plate exchanger before being poured into the starting container of the micro-filtration installation.

This installation was a Tetra-Laval MFS1 unit provided with a SCT Membralox P19-40 multichannel bar with a pore diameter of 5 $\mu$m and a filtering surface of 0.2 sqm. The system feed was carried out from the starting container through an Alfa-Laval KH 10-50 type centrifugal pump. Circulation in the retentate ring was obtained through a lobe volumetric pump (pump IBEX 53-2H) with variable flow rate adjusted to 4.0 m$^3$/h, so that an average tangential speed of 4.6 m/s was reached. Circulation in the permeate ring was performed through a lobe volumetric pump (pump IBEX 42-2H) with variable flow rate automatically regulated depending upon the charge loss created in the retentate ring. Circulation was made in a co-current way so as to maintain a uniform transmembrane pressure of 480 mbar.

Filtration was performed continuously and the extraction flow rates for permeate and retentate were established respectively at 1875 and 208 l/hr/sqm, that means with a concentration factor of 10.

In such operating conditions, fats distribution is as indicated in Table I.

TABLE I

|  | Content in g/kg | Mass percentage |
|---|---|---|
| Milk | 43.0 | 100 |
| Permeate | 34.0 | 71 |
| Retentate | 161 | 30 |

EXAMPLE 2

This example was carried out from crude whole milk mixture on the same installation as in Example 1.

The used parameters were as follows:
SCT Membralox P19-40 membrane: pore diameter 3 μm, filtering surface 0.2 sqm;
Temperature 51° C.;
Retentate circulation flow rate : 6.2 m³/hr;
Retentate average tangential speed: 7.2 m/s;
Transmembrane pressure: 610 mbar;
Extraction flow rate: permeate: 1040 l/hr/sqm retentate 115 l/hr/sqm;
Concentration factor: 10
Fats distribution is as follows (Table II):

TABLE II

|  | Content in g/kg | Mass percentage |
|---|---|---|
| Milk | 43.9 | 100 |
| Permeate | 37.0 | 76 |
| Retentate | 110.0 | 25 |

EXAMPLE 3

This example was carried out from crude whole milk mixture on the same installation as in Example 1.

The used parameters were as follows:
SCT Membralox P19-40 membrane: pore diameter 2 μm, filtering surface 0.2 sqm;
Temperature: 49° C.;
Retentate circulation flow rate: 6.6 m³/hr;
Average tangential speed: 7.6 m/s;
Transmembrane pressure: 570 mbar;
Extraction flow rate: permeate: 755 l/hr/sqm retentate: 120 l/hr/sqm;
Concentration factor: 7.3
Fats distribution is as follows (Table III):

TABLE III

|  | Content in g/kg | Mass percentage |
|---|---|---|
| Milk | 42.9 | 100 |
| Permeate | 17.0 | 34 |
| Retentate | 196 | 63 |

EXAMPLE 4

This example was carried out from cream obtained by centrifugal skimming on an industrial installation at 50° C. of a crude whole milk mixture. Fats content of the cream (421 g/kg) was reduced to 200 g/kg by dilution with skimmed milk before microfiltration.

The installation disclosed in Example 1 was used with the following parameters:
SCT Membralox P19-40 membrane: pore diameter 5 μm, filtering surface 0.2 sqm;
Temperature: 53° C.;
Retentate circulation flow rate: 4.3 m³/hr;
Average tangential speed: 5 n/s;
Transmembrane pressure: 230 mbar;
Extraction flow rate: permeate: 250 l/hr/sqm retentate: 250 l/hr/sqm;
Concentration factor: 2
Fats distribution was as follows (Table IV):

TABLE IV

|  | Content in g/kg | Mass percentage |
|---|---|---|
| Diluted cream | 200 | 100 |
| Permeate | 150 | 37.5 |
| Retentate | 249 | 62.2 |

EXAMPLE 5

This example was carried out from cream obtained by centrifugal skimming on an industrial installation at 50° C. of a crude whole milk mixture. Fats content of the cream (410 g/kg) was reduced to 203 g/kg by dilution with skimmed milk before micro-filtration.

The installation disclosed in Example 1 was used with the following parameters:
SCT Membralox P19–40 membrane: pore diameter 2 μm, filtering surface 0.2 sqm;
Temperature: 49° C.;
Retentate circulation flow rate : 4.5 m³/hr;
Average tangential speed: 5.1 m/s;
Transmembrane pressure: 422 mbar;
Extraction flow rate: permeate: 256 l/hr/sqm retentate 120 l/hr/sqm;
Concentration factor: 3.1
Fats distribution was as follows (Table V):

TABLE V

|  | Content in g/kg | Mass percentage |
|---|---|---|
| Diluted cream | 203 | 100 |
| Permeate | 84 | 28 |
| Retentate | 424 | 67 |

EXAMPLE 6

A crude whole milk mixture heated at 50° C. was poured into the starting container of a different micro-filtration installation from this of Examples 1 to 5.

Such Tetra-Laval MFS1 unit was different from the first one on the following points:
totally manual operation;
centrifugal pumps;
feeding: Alfa-Laval GM-2A/115
retentate circulation: FRISTAM, FP 712
permeate circulation: Alfa-Laval GM-2A/115.

The used parameters were as follows:

SCT Membralox P19-40 membrane: pore diameter 5 μm, filtering surface 0.2 sqm;
Temperature: 50° C.;
Retentate circulation flow rate: 6 m³/hr;
Average tangential speed: 6.9 m/s;
Transmembrane pressure: 1750 mbar;
Extraction flow rate: permeate: 1750 l/hr/sqm
retentate: 90 l/hr/sqm;
Concentration factor: 20
Fats distribution was as follows (Table VI):

TABLE VI

|  | Content in g/kg | Mass percentage |
| --- | --- | --- |
| Milk | 42.6 | 100 |
| Permeate | 35 | 78 |
| Retentate | 190 | 22 |

EXAMPLE 7

The permeate resulting from a micro-filtration on SCT Membralox P19-40 membrane with a pore diameter of 2 μm in Example 3 corresponded to a consumption semi-skimmed milk. In comparison, a control milk was prepared by mixing skimmed milk and cream resulting from a centrifugal skimming of a whole milk aliquot part subjected to the micro-filtration. The composition of both milks was as follows (Table VII):

TABLE VII

| Content in g/kg | Control milk | Micro-filtered milk (permeate) |
| --- | --- | --- |
| EST | 107.9 | 108.4 |
| MG | 16.9 | 17.0 |
| MAT | 35.6 | 35.8 |
| Lactose | 48.8 | 48.8 |

Both milks were pasteurised at 72° C. during 15 seconds and immediately cooled at 2° C. and held 24 hours at that temperature.

The sensorial analysis has showed that the tasters differentiated both milks with their texture. Micro-filtered milk was judged as more consistent, creamier and more mouth-watering.

EXAMPLE 8

Two cheese milks were prepared by mixing products of Example 5:
control milk: skimmed milk and cream at 410 g/kg fats;
micro-filtered milk: skimmed milk and permeate containing 84 g/kg fats.
The milks had the following composition (in g/kg—Table VIII):

TABLE VIII

|  | EST | MG | MAT | Lactose |
| --- | --- | --- | --- | --- |
| Control milk | 118 | 28.5 | 35.0 | 48.4 |
| Micro-filtered milk | 117 | 28.2 | 34.5 | 48.1 |

Both milks were converted in camembert cheese according to a conventional technology for a skilled man and in strictly identical conditions:

pasteurisation at 72° C. and 15 seconds
seeding with mesophilic yeasts EZAL MM 101 (0.02 unit/kg) and Flora Danica (0.08 unit/kg)
pre-maturation during 16 hr at 13° C.
heating at 34° C. and rennet treatment at pH 6.25
coagulation, cutting, dripping, turning over with temperature cinetics according to the skilled man habits
salting with brine
seeding surface flora
refining: 10 days at 13° C.
7 days at 7° C.
7 days at 4° C.

Upon mould releasing, cheese composition were as follows (Table IX):

TABLE IX

|  | EST in g/kg | pH |
| --- | --- | --- |
| Control cheese | 401 | 4.60 |
| Cheese produced from micro-filtered milk | 393 | 4.56 |

The rheological analysis of cheese texture by measuring penetration force through a STEVENS device in the same operating conditions has given the following results (an average of 20 measurements) (Table X):

TABLE X

|  | Penetration force in g | Tangential stress in Pa |
| --- | --- | --- |
| Control milk | 35.98 | 5838 |
| Cheese produced from micro-filtered milk | 31.62 | 5130 |

Such results confirmed a softer and finer texture perceived upon tasting cheese from micro-filtered milk.

After refining, the tasters differentiated cheese from micro-filtered milk through the texture of the non refined part (heart) judged as less chalky.

EXAMPLE 9

Two cheese milks were prepared with the following components:
control milk: crude whole milk used in Example 3 and skimmed milk obtained by centrifugation at 35° C. of the same milk,
micro-filtered milk: permeate of Example 3.
The composition of the milks (in g/kg) was as follows (Table XI):

TABLE XI

|  | EST | MG | MAT | Lactose |
| --- | --- | --- | --- | --- |
| Control milk | 108 | 16.9 | 35.6 | 48.8 |
| Micro-filtered milk | 108 | 17.0 | 35.8 | 48.8 |

Such milks were converted in non refined fresh cheese according to the following technology known from the skilled man:
pasteurisation of milks at 72° C. during 15 seconds
seeding of 4 kg of each milk at 26° C.: yeasts EZAL MM 101–0.06 unit/kg
room maturation at 22° C.
after 1.30 hr maturation: rennet treatment with 0.1 ml rennet extract/kg after 17 hr maturation: moulding in perforated cylindrical moulds (1 kg coagulum per mould) of 5.5 cm diameter and 20 cm height dripping at 22° C. during 24 hours mould release and cooling at 13° C.

The dry matter contents of the cheese were respectively 282 g/kg for the control cheese and 286 g/kg for the cheese produced with micro-filtered milk.

The sensorial analysis of the cheese showed that the texture of the cheese from micro-filtered milk was finer, more homogenous, more consistent and less firm.

The rheological analysis of cheese texture by measuring penetration force through a STEVENS device in the same operating conditions showed also a difference (results: an average of 20 measurements), see Table XII:

TABLE XII

|  | Penetration force in g | Tangential stress in Pa |
|---|---|---|
| Control milk | 23.0 | 3731 |
| Cheese produced from micro-filtered milk | 18.9 | 3073 |

EXAMPLE 10

Comparison

This example was carried out from crude whole milk mixture on the same installation as in Example 1.

The used parameters were as follows:

SCT Membralox P19-40 membrane: pore diameter 1.4 $\mu$m, filtering surface 0.2 sqm;

Temperature: 50° C.;

Retentate circulation flow rate : 6.6 m$^3$/hr;

Average tangential speed: 7.6 m/s;

Transmembrane pressure: 500 mbar;

Extraction flow rate: permeate: 275 l/hr/sqm retentate: 69 l/hr/sqm;

Concentration factor: 5

Fats distribution is as follows (Table XIII):

TABLE XIII

|  | Content in g/kg | Mass percentage |
|---|---|---|
| Milk | 44.8 | 100 |
| Permeate | 5.6 | 10 |
| Retentate | 214 | 95 |

EXAMPLE 11

Comparison

This example was carried out from crude whole milk mixture on the same installation as in Example 1.

The used parameters were as follows:

SCT Membralox P19-40 membrane: pore diameter 0.8 $\mu$m, filtering surface 0.2 sqm;

Temperature: 50° C.;

Retentate circulation flow rate: 6.6 m$^3$/hr;

Average tangential speed: 7.6 m/s;

Transmembrane pressure: 600 mbar;

Extraction flow rate: permeate: 285 l/hr/sqm retentate: 71 l/hr/sqm;

Concentration factor: 5

Fats distribution was as follows (Table XIV):

TABLE XIV

|  | Content in g/kg | Mass percentage |
|---|---|---|
| Milk | 44.8 | 100 |
| Permeate | 2.4 | 4 |
| Retentate | 224 | 100 |

EXAMPLE 12

Comparison

This example was carried out from crude goat whole milk mixture on the same installation as in Example 1.

The used parameters were as follows

SCT Membralox P19-40 membrane: pore diameter 12 $\mu$m, filtering surface 0.2 sqm;

Temperature: 50° C.;

Retentate circulation flow rate : 5.4 m$^3$/hr;

Average tangential speed: 6.3 m/s;

Transmembrane pressure: 320 mbar;

Extraction flow rate: permeate: 750 l/hr/sqm retentate: 83 l/hr/sqm;

Concentration factor: 10

Fats distribution is as follows (Table XV):

TABLE XV

|  | Content in g/kg | Mass percentage |
|---|---|---|
| Milk | 37.1 | 100 |
| Permeate | 24.4 | 59 |
| Retentate | 149 | 40 |

The above-mentioned examples illustrate the surprising effects on the texture of dairy products prepared from micro-filtration permeates enriched differentially with fat globules of a small size with respect to the milk in contact with the micro-filtration membrane. Such enrichment multiplies the globule interaction properties with the other milk components.

With the invention, the dairy-farming industry provides an industrial fractioning process for dairy globule fats. It is a new and ample way of diversification that is offered thereby to the dairy technicians for converting fat products. The fat globule enriched and depleted fraction in small size are adapted to lead to:

cheese of any category, different texture and different flavour, with numerous enzymes being localized in fat globule membrane;

butters, creams of differentiated texture and flavour with differentiated co-products (buttermilk, skimmed milk);

fermented milks with differentiated texture and flavour;

fat milk powders with differentiated preservation and differentiated texture and flavour after reconstitution.

The invention finds thus a very ample application in dairy conversion.

EXAMPLE 13

This example was carried out from cream-enriched whole milk on the same installation as in Example 1.

The used parameters were as follows:

SCT Membralox P19-40 membrane: pore diameter 2 $\mu$m, filtering surface 0.2 sqm;

Temperature: 50° C.;
Retentate circulation flow rate: 5.6 m³/hr;
Average tangential speed: 6.5 m/s;
Transmembrane pressure: 550 mbar;
Extraction flow rate: permeate: 355 l/hr/sqm
retentate: 89 l/hr/sqm;
Concentration factor: 5
Fats distribution was as follows:

TABLE XVI

|  | Content in g/kg | Mass percentage |
|---|---|---|
| Milk | 88 | 100 |
| Permeate | 45 | 40 |
| Retentate | 280 | 63 |

The permeate and retentate fractions were concentrated in fats by centrifugation through a conventional skimmer. Similarly part of the mixture of whole milk and cream subjected to the micro-filtration was converted into cream (control cream). The fats contents were adjusted to 340 g/kg.

They were subjected to a heat treatment at 75° C. during 20 seconds.

They were cooled at 40° C. during 3 hr 30 and then heated at 18° C. and seeded with lactic yeasts (EZAL MM 100 and MD 099). They experienced a maturation at that temperature up to a pH of 5.15.

They were then cooled and churned at 12° C. (Elecrem 30 mark).

The so-obtained butters had the following composition.

TABLE XVII

| Butter | Contents in g/kg | | | | |
|---|---|---|---|---|---|
|  | EST | MG | WATER | NON FAT MS | NaCl |
| Control | 860 | 851 | 123 | 26 | 10.3 |
| Permeate | 882 | 872 | 104 | 24.5 | 8.9 |
| Retentate | 865 | 850 | 120 | 29 | 10.8 |

Preliminary tasting:

Permeate butter was greasy, little melting and very different from the control butter.

Retentate butter was melting and very similar to the control butter.

What is claimed is:

1. A process for selectively separating according to their size the fat globules present in a food or biological medium comprising subjecting the medium to be treated to at least a tangential micro-filtration on a membrane with a cut-point threshold between 1.8 and 10 $\mu$m under substantially uniform transmembrane pressure conditions and recovering the so-obtained retentate and permeate.

2. The process of claim 1, wherein a mineral, organic or composite membrane is used adapted to the tangential micro-filtration installation being implemented.

3. The process of claim 1, wherein the process is performed discontinuously or continuously.

4. The process of claim 1 wherein the food medium to be treated is milk or a dairy product or a mixture containing at least one milk and various milk components.

5. The process of claim 4 wherein crude whole milk is treated.

6. The process of claim 1 wherein the process is carried out using a single micro-filtration membrane or in cascade, by performing at least two successive micro-filtrations at different cut-point thresholds, selected in the range of 1.8 to 10 $\mu$m to select a fat globule population.

7. The process of claim 1 wherein the fat globule containing medium is modified upon micro-filtration by diafiltration, wherein the medium being micro-filtered or the corresponding retentate is added with another medium or solution.

* * * * *